J. FORD.
COTTON HARVESTER.
APPLICATION FILED DEC. 22, 1914.
1,214,490.
Patented Jan. 30, 1917.
4 SHEETS—SHEET 4.
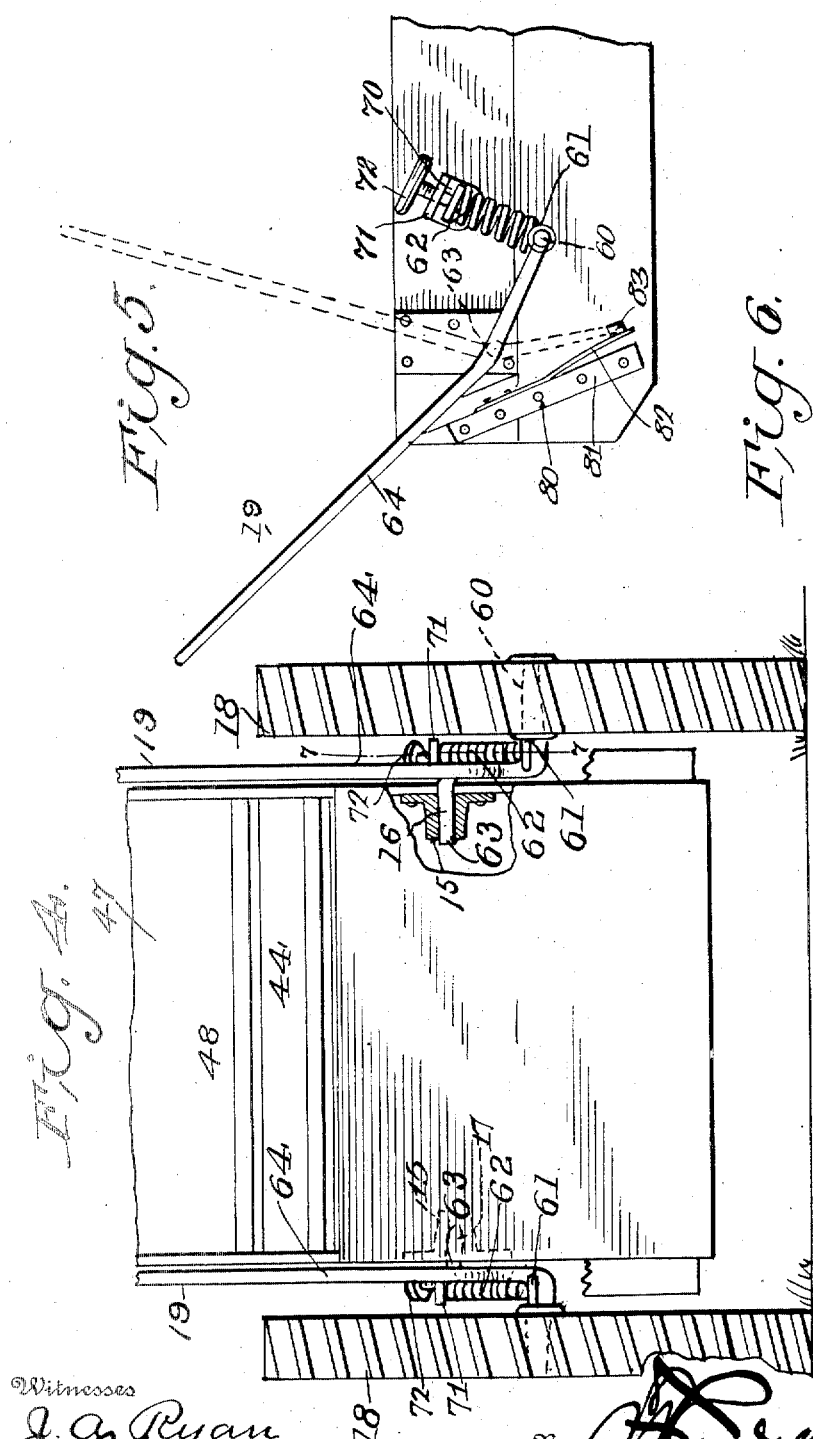

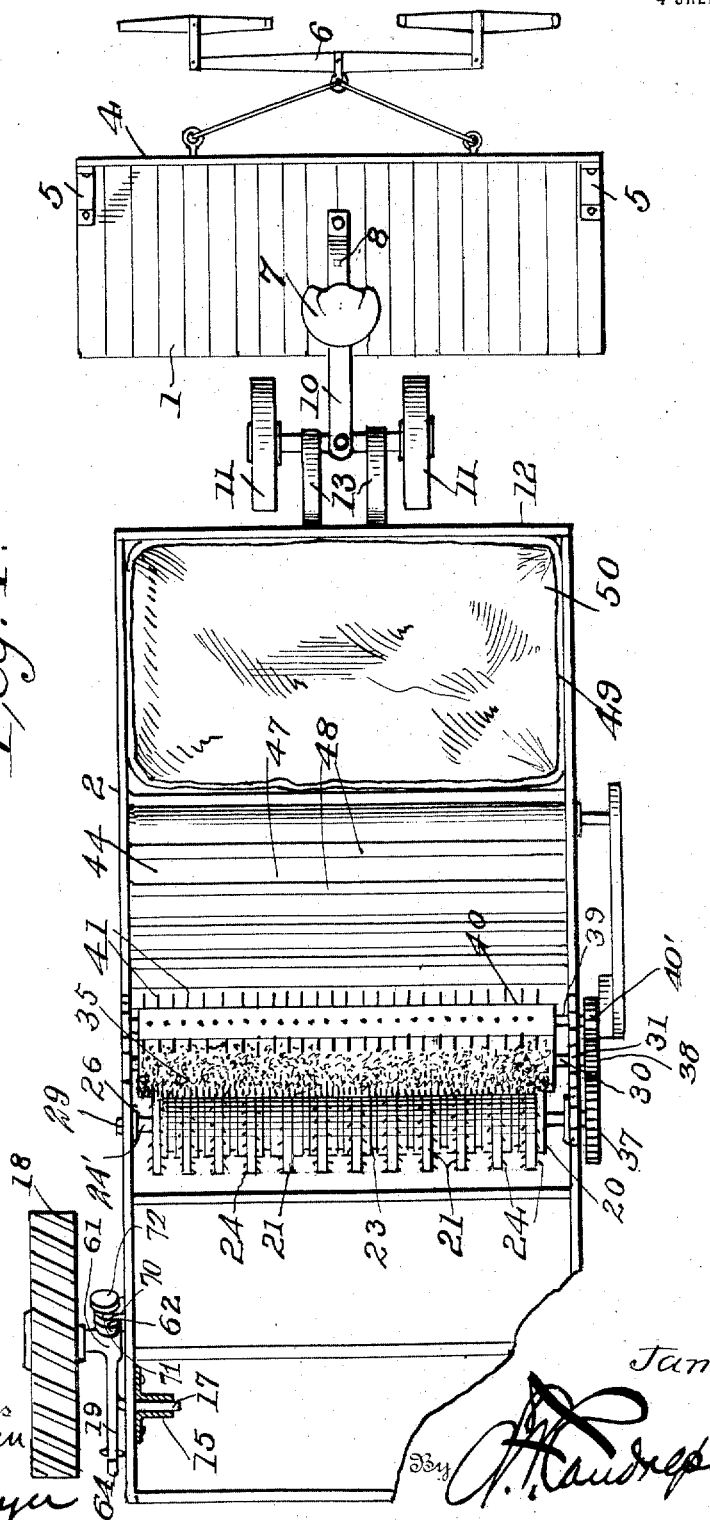

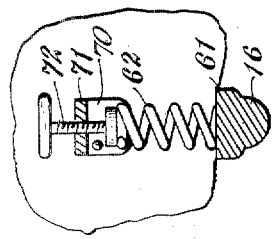
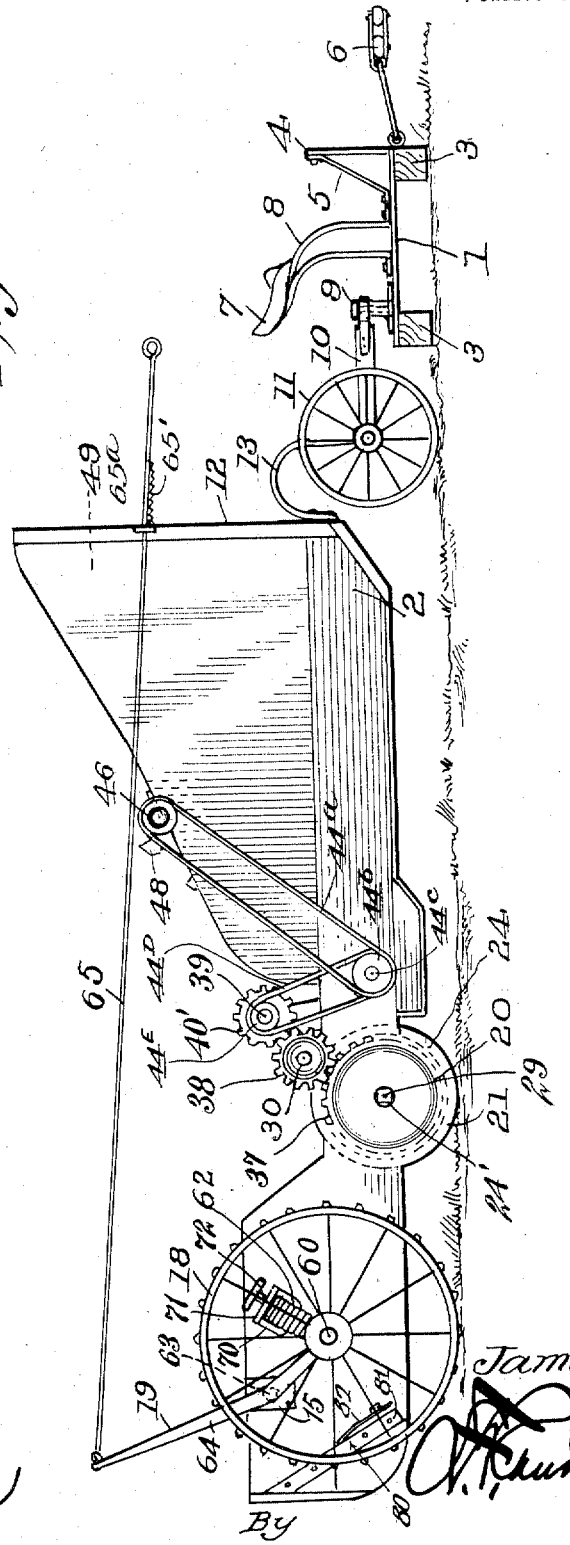

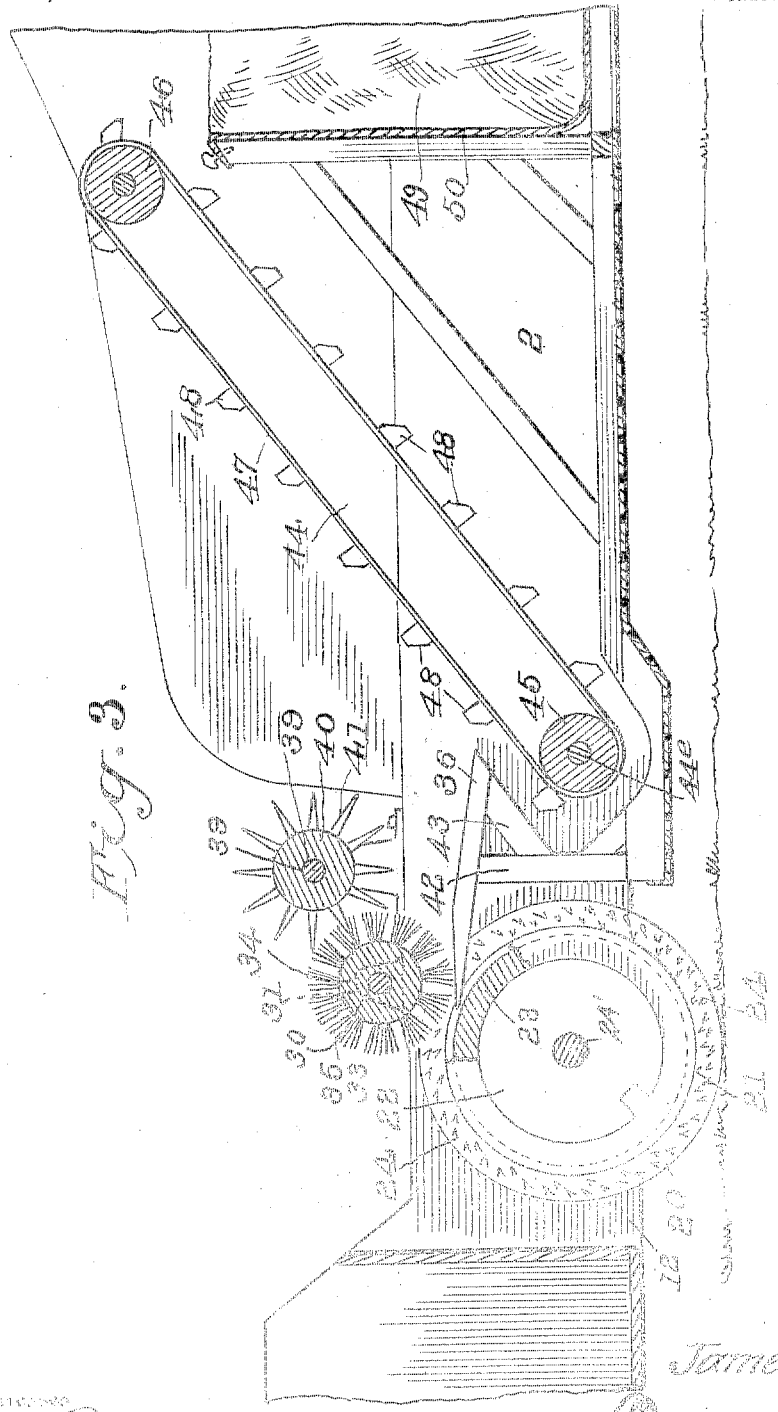

UNITED STATES PATENT OFFICE.

JAMES FORD, OF CHRISTOVAL, TEXAS.

COTTON-HARVESTER.

1,214,490.  Specification of Letters Patent.  Patented Jan. 30, 1917.

Application filed December 22, 1914. Serial No. 878,587.

*To all whom it may concern:*

Be it known that I, JAMES FORD, a citizen of the United States, residing at Christoval, in the county of Tom Green and State of Texas, have invented certain new and useful Improvements in Cotton-Harvesters; and I do hereby declare the following to be a full, clear, and exact description of the invention, such as will enable others skilled in the art to which it appertains to make and use the same.

This invention relates to cotton harvesters, and the primary object of the invention is the provision of a cotton harvester embodying a picking cylinder so constructed as to pick the cotton off the ground; the same being preferably useful for harvesting the late maturing portion of a cotton crop which is most difficult and expensive to pick by hand.
Another object of this invention is the provision of a cotton harvester which has a drag positioned forwardly of the cotton picking cylinder for crushing the bolls, which are unopened or are only partially open for the purpose of facilitating the picking of this portion of the cotton. The unevenness of the ground over which the cotton harvester travels will eliminate the liability of the accumulation of cotton bolls or plants in front of the sleepers of the drag.

With the foregoing and the other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of a cotton harvester. Fig. 2 is a side elevation of the improved cotton harvester. Fig. 3 is a central longitudinal section through the picking section of the harvester. Fig. 4 is an end view of the improved cotton harvester, and Fig. 5 is a detail view of a part of the construction of the harvester. Fig. 6 is a detail view of a part of the harvester construction. Fig. 7 is a sectional view on the line 7—7 of Fig. 4.

Referring more particularly to the drawings, 1 designates the platform of a drag structure which is positioned forwardly of the harvester proper 2. The platform 1 of the drag structure is mounted upon sleepers or cross beams 3, which ride over the ground and are provided for breaking down cotton stalks and crushing unopened or partially opened pods so as to enable the cotton pickers to gather the cotton from these pods. The platform 1 has a vertical upright dash board 4 which is secured to the forward end thereof and securely supported by angle braces 5. Double trees 6 may be attached to the forward end of the drag to provide for attaching horses or other draft animals or power to the front end of the drag. A seat 7 provided for the driver is supported above the platform 1 by spring bars 8 of the ordinary type.

The platform 1 of the drag has king bolt 9 detachably carried thereby for attaching the tongue 10 of the harvester 2 to the drag structure. The tongue 10 is connected to the front truck 11 of the cotton harvester, which truck is secured to the frame 12 of the harvester by yieldable arms 13. The rear end of the frame 2 has bearings 15 secured to the inner surfaces of the side walls thereof, in which bearings are rotatably seated the inner ends of crank axles 16 and 17. The crank axles 10 and 17 have traction wheels 18 mounted rotatably thereupon, and they also have levers 19 connected thereto whereby the elevation of the frame 12 with respect to the ground over which it is traveling may be varied to suit conditions. The crank axles 16 and 17 are operable independent of each other in order to permit a limited movement of one end of the picking cylinder 20 with respect to the other end when traveling over uneven ground.

The picking cylinder 20 which is rotatably carried by the frame 2 intermediate of the front end and the rear end thereof is composed of metallic annuli 21, which are spaced longitudinally along a wooden core or axle 22. The annuli 21 are held in proper spaced relation with each other by washers or collars 23 which are positioned between the facing sides of the annuli.

The annuli 21 have facial teeth 24 formed thereon, which teeth may be either straight or slightly curved, but must be positioned so that the points thereof are slightly higher than the heels of the teeth when they are at their lowest position during the rotation of the annuli. The teeth 24 are formed so that the points thereof are inclined toward the rear traction wheels, when positioned beneath the central core or axle 22, as is clearly shown in Fig. 3 of the drawings.

The wooden core 22 of the picking annuli 20 is supported by two axles 24', which have screw threads 25 formed upon one end thereof for insertion into the wooden axle or core 22. The axles 24' have collars 26 formed thereupon which collars are provided for engagement against the inner surface of the side walls of the frame 2. The shafts also have smooth portions 28 which are rotatably mounted in suitable bearings formed in the side walls of the frame 2 and they have their extreme outer ends formed rectangular in shape as is shown at 29 to provide for the insertion of the screw threaded ends thereof into the core or axle 22.

A shaft 30 is rotatably supported by brackets 31 upon the upper edges of the sides of the frame 2 and it has mounted thereupon a cleaning brush 33. The cleaning brush 33 comprises a core 34 which has a plurality of radiating bristles 35 formed upon the outer surface thereof. The bristles 35 are formed so that they will brush the teeth 24 of the annuli 21 for cleaning the cotton from the teeth 24 and depositing it upon a guiding platform 36.

The shaft 30, and consequently the brush 33 are rotated by the meshing engagement of gears 37 and 38, the gear 37 is mounted upon one of the axles 24' and is of greater diameter than the gear 38 which is mounted upon the shaft 30, so that the shaft 30 and the brush 33 will rotate at a greater speed than the speed of rotation of the picking cylinder 20 or annuli 21. Another shaft 39 is rotatably supported above the upper edge of the side walls of the frame 2 and it has mounted thereupon a core 40, to which core is attached a plurality of circumferentially and longitudinally spaced fingers 41. The fingers 41 engage the bristles 35 of the brush and extract any cotton therefrom, which might cling to the bristles of the brush after it has been gathered from the teeth 24. The shaft 39 has a gear 40' mounted thereon which meshes with the gear 38, for rotating the shaft 39 by the rotation of the shaft 30. While a certain form of gearing has been shown in the drawings and described, it is to be understood that any desired changes may be made in the gearing, without departing from the spirit of this invention.

The guiding platform 36 is supported at an incline within the frame 2 by a vertical partition 42 and an angularly disposed brace 43, so that the cotton deposited thereupon by the brush 33 will slide off the same by gravitation upon a conveyer 44.

The conveyer 44 travels over rollers 45 and 46, which are supported in any suitable manner by the sides of the frame 2. The conveyer 44 comprises a canvas belt 47, which has strips 48 secured at spaced intervals thereto and projecting outwardly therefrom for receiving the cotton from the platform 36 and carrying it upwardly and depositing it within the cotton retaining compartment 49. The cotton retaining compartment 49 has a removable cloth sack or basket 50 positioned therein to facilitate the removal of the cotton from the harvester. The conveyer 44 is operated by a belt 44$^a$ which travels about a pulley 44$^b$ carried by a shaft 44$^c$. The shaft 44$^c$ is operated by a belt 44$^d$ which is operated by the shaft 39 through the medium of a pulley 44$^e$. The rod 65 may have a plurality of notches or roughened portions 65' formed thereon which are adapted for engagement with the plates 65$^a$ for holding the rod 65 and consequently the lever 19 in various adjusted positions.

A stop structure 80 is carried by the supporting frame of the harvester and it includes a bar 81 which has a spring plate 82 attached thereto. The spring plate 82 has its lower end spaced from the bar 81 as clearly shown in Fig. 5 of the drawing. A cushioning block 83 is mounted upon the lower end of the spring plate or bar 82. The stop structure 80 is provided for limiting the rearward and downward movement of the axles 16 and 17.

In the operation of the improved cotton harvester: After the cotton has been passed over by the drag structure which crushes the unopen or partially open pods, the picking cylinder 20 will engage the cotton pods and plants and the teeth 24 upon the annuli 21 thereof will gather up the cotton and carry it upwardly, depositing it upon the platform 36 by the action of the brush 33. The annuli 21 bear upon the ground over which the harvester is traveling, so that rotation will be imparted thereto by the travel of the harvester and for properly positioning the teeth 24 for gathering the cotton. The teeth are formed upon the sides of the annuli and project obliquely or angularly outwardly from the surface of the annuli.

The rear angled axle 16 is constructed of a single bar, which has the spindle portion 60 formed thereupon, upon which spindle the traction wheel 18 rides. The axle 16 has a shoulder 61 formed thereupon upon which a coiled spring 62 presses. The spring 62 presses downwardly against the face of the shoulder or enlargement 61. The spring 62 tends to force the axles downwardly and therefore force the rear supporting wheels against the surface of the ground over which the harvester is traveling, relieving the annuli of a part of the weight of the harvester. The spring 62 further aids the operator in lowering the rear wheels. The axles 16 and 17 also have auxiliary spindles or shafts 63 formed thereupon, which extend into and are rotatably mounted in the bearings 15. The auxiliary spindles act as pivotal supports for the movement of the crank axles by the pivotal movement of the handles 19. The handle or lever portion 64, which forms the levers 19, is formed integrally with the axle and extends upwardly therefrom, having rods 65 connected to its upper free end to provide for the manual manipulation of the same. The springs 62 are carried by and held in place by brackets 70, which have their upper ends 71 bent angularly to the body portions of the brackets. The brackets 70 are secured to the casing of the harvester in any suitable manner. Pressure or tension regulating screws 72 are carried by the angled ends 71 of the brackets and by adjusting the pressure screws 72 with respect to the angled ends 71, the tension of the springs 62 may be regulated as desired. The handles 19 are provided for pivotally moving the axles 16 and 17 for moving the wheels 18 with respect to the body of the harvester for raising the annuli out of a ground engaging position when desired.

From the foregoing description taken in connection with the accompanying drawings the advantages of the construction and of the method of operation of the improved cotton harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cotton harvester, a supporting frame, a pair of alining relatively spaced axles rotatably carried by said frame, a wooden core connected to and positioned between the spaced ends of said axles, a plurality of annuli mounted upon said roller in spaced relation with respect to each other, teeth formed upon the sides of said annuli and projecting at an incline laterally therefrom for engaging the cotton and picking it from bolls.

2. In a cotton harvester, a supporting frame, a pair of alining relatively spaced axles rotatably carried by said frame, a wooden core connected to and positioned between the spaced ends of said axles, a plurality of annuli mounted upon said roller in spaced relation with respect to each other, teeth formed upon the sides of said annuli and projecting at an incline laterally therefrom for engaging the cotton and picking it from bolls, said annuli bearing upon the ground and rotated through the traction of said frame.

3. In a cotton harvester, a supporting frame, a pair of alining relatively spaced axles rotatably carried by said frame, a wooden core connected to and positioned between the spaced ends of said axles for rotation with the axles, a plurality of annuli mounted upon said core in spaced relation with respect to each other, teeth formed upon the sides of said annuli and projecting at an incline laterally therefrom for engaging cotton and picking it from bolls, said annuli bearing upon the ground and rotated by the traction of the frame, a brush rotatably mounted above said annuli, a gear carried by one of said axles, a gear operatively connected to said brush and meshing with said axle carried gear for rotating said brush by the rotation of the axles, said axles being rotated by the rotation of said wooden core during the rotation of said annuli, a cleaning roller mounted forwardly of and upwardly from said brush for cleaning the cotton therefrom, an inclined platform positioned for receiving the cotton from said cleaning roller, a conveyer for receiving the cotton from said platform, means for rotating said cleaning roller, and means for operating said conveyer.

4. In a cotton harvester, a supporting frame, a pair of alining spaced axles rotatably carried by said frame, a wooden core connected to and positioned between the spaced ends of said axles for rotation with the axles, a plurality of annuli mounted upon said roller in spaced relation with respect to each other, teeth formed upon the sides of said annuli and projecting at an incline laterally therefrom for engaging the cotton and picking it from bolls, said annuli bearing upon the ground and rotated by the traction of said frame, a brush rotatably mounted above said annuli, a gear carried by one of said axles, a gear operatively connected to said brush and meshing with said axle carried gear for rotating said brush by the rotation of said axles, said axles being rotated by said wooden core during the rotation of said annuli, a cleaning roller mounted forwardly of and upwardly from said brush for cleaning cotton therefrom, an inclined platform positioned for receiving the cotton from said cleaning roller, a conveyer for receiving the cotton from said platform, means for rotating said cleaning roller, means for operating said conveyer, and a drag structure detachably connected to the forward end of said frame for crushing the bolls preparatory to the extraction of cotton therefrom by said annulus carried teeth.

In testimony whereof I affix my signature in presence of two witnesses.

JAMES FORD.

Witnesses:
J. H. WARE,
B. T. WELCH.

Copies of this patent may be obtained for five cents each, by addressing the "Commissioner of Patents, Washington, D. C."